US009874992B2

(12) United States Patent
Skinner et al.

(10) Patent No.: US 9,874,992 B2
(45) Date of Patent: Jan. 23, 2018

(54) PREVIEW PANE FOR TOUCH INPUT DEVICES

(71) Applicant: Lenovo (Singapore) Pte. Ltd., Singapore (SG)

(72) Inventors: Jeffrey E. Skinner, Raleigh, NC (US); Jonathan Jen-Wei Yu, Raleigh, NC (US); Aaron Michael Stewart, Raleigh, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 177 days.

(21) Appl. No.: 14/461,858

(22) Filed: Aug. 18, 2014

(65) Prior Publication Data
US 2016/0048268 A1    Feb. 18, 2016

(51) Int. Cl.
| | |
|---|---|
| *G06F 3/048* | (2013.01) |
| *G06F 3/0481* | (2013.01) |
| *G06F 3/0484* | (2013.01) |
| *G06F 3/0488* | (2013.01) |
| *G06F 17/24* | (2006.01) |
| *G06F 17/21* | (2006.01) |

(52) U.S. Cl.
CPC .......... *G06F 3/0481* (2013.01); *G06F 3/0484* (2013.01); *G06F 3/0488* (2013.01); *G06F 3/04812* (2013.01); *G06F 3/04886* (2013.01); *G06F 17/212* (2013.01); *G06F 17/24* (2013.01)

(58) Field of Classification Search
CPC ..................................................... G06F 3/0481
USPC ........................................................ 715/781
See application file for complete search history.

(56) References Cited

U.S. PATENT DOCUMENTS

| | | | | |
|---|---|---|---|---|
| 7,596,766 | B1* | 9/2009 | Sharma | G06F 3/04895 715/711 |
| 2003/0210270 | A1* | 11/2003 | Clow | G06F 3/0481 715/767 |
| 2004/0268231 | A1* | 12/2004 | Tunning | G06F 17/2247 715/236 |
| 2004/0268232 | A1* | 12/2004 | Tunning | G06F 9/4443 715/234 |
| 2005/0246643 | A1* | 11/2005 | Gusmorino | G06F 17/30905 715/734 |
| 2005/0251748 | A1* | 11/2005 | Gusmorino | G06F 17/30126 715/713 |
| 2008/0122796 | A1* | 5/2008 | Jobs | G06F 3/0488 345/173 |
| 2012/0147406 | A1* | 6/2012 | Yamaneki | H04N 1/00217 358/1.13 |
| 2013/0132832 | A1* | 5/2013 | Nakamura | G06F 17/24 715/271 |
| 2013/0305189 | A1* | 11/2013 | Kim | G06F 3/0482 715/838 |

(Continued)

FOREIGN PATENT DOCUMENTS

| | | |
|---|---|---|
| JP | H07334284 A | 12/1995 |
| JP | H09305266 A | 11/1997 |

*Primary Examiner* — William Titcomb
(74) *Attorney, Agent, or Firm* — Ference & Associates LLC (57) ABSTRACT

One embodiment provides a method, comprising: displaying text data on a display device; receiving, using a processor, a user input positioning a cursor within the text data; and displaying, on a preview pane, at least a portion of the text data in which the cursor is positioned. Other aspects are described and claimed.

18 Claims, 7 Drawing Sheets

(56) References Cited

U.S. PATENT DOCUMENTS

| | | | |
|---|---|---|---|
| 2013/0339907 A1* | 12/2013 | Matas | G06T 11/60 715/853 |
| 2014/0173530 A1* | 6/2014 | Mesguich Havilio | G06F 3/0482 715/863 |
| 2014/0194164 A1* | 7/2014 | Lee | G06F 3/0485 455/566 |
| 2014/0195961 A1* | 7/2014 | Shoemaker | G06F 3/0483 715/776 |
| 2014/0380142 A1* | 12/2014 | Mikutel | G06F 17/24 715/234 |

* cited by examiner

PREVIEW PANE FOR TOUCH INPUT DEVICES

BACKGROUND

Many people use information handling devices (e.g., smart phones, tablets, laptop computers, personal computers, etc.) to input data (e.g., text data) into applications (e.g., a word processing program, a webpage, a text messaging application, etc.). With the portability of information handling devices increasing, users are more commonly using devices that have touch input devices. These touch devices do not have mechanical keys and their inherent tactile feedback, so users tend to continually look between the input device and the display screen to ensure what they are a inputting through the input device is being input into the application.

BRIEF SUMMARY

In summary, one aspect provides a method, comprising: displaying text data on a display device; receiving, using a processor, a user input positioning a cursor within the text data; and displaying, on a preview pane, at least a portion of the text data in which the cursor is positioned.

Another aspect provides an information handling device, comprising: a display device; a processor operatively coupled to the display device; a memory device that stores instructions executable by the processor to: display text data on the display device; receive a user input positioning a cursor within the text data; and display on a preview pane at least a portion of the text data in which the cursor is positioned.

A further aspect provides a product, comprising: a storage device having code stored therewith, the code being executable by a processor and comprising: code that displays text data on a display device; code that receives a user input positioning a cursor within the text data; and code that displays on a preview pane, at least a portion of the text data in which the cursor is positioned.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

DETAILED DESCRIPTION

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, the appearance of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, et cetera. In other instances, well known structures, materials, or operations are not shown or described in detail to avoid obfuscation.

As information handling devices (e.g., smart phones, tablets, personal computers, laptops, etc.) become more portable users tend to do more and more with these devices. Users use their devices to complete different tasks which require data input for example, creating, updating, and/or inputting information into: spreadsheets, documents, web pages, and the like. Unfortunately, with some devices, the display area is not located next to the input device (e.g., keyboard, touch screen, touchpad, etc.). For example, a tablet may have a touch keyboard located at the bottom of the screen, while the display area is located at the very top of the screen. As another example, a user may use a keyboard connected to a television, where the keyboard is near the user and the television is located across the room. As a further example, a user may use a laptop where the keyboard is located on one plane and the display screen is located on a second plane.

In such cases where the input device and display area are not located adjacent to each other, a user may have to look between the input device and the display device to ensure what they are inputting is the correct data. For example, if a user is using a touch keyboard the lack of tactile feedback may require that the user look at their hands to see what they are typing. Alternatively, if a person is not a proficient touch typist they may need to look at their hands to see which keys they are pressing and then at the screen to see what they are typing. This requires the user to look back and forth between the input device and the display area. This looking back and forth may slow the user down and often requires a user to remember what they saw on the display before continuing to input information through the input device.

Accordingly, an embodiment provides a method of locating a pane near the input device to allow the eye travel of the user to be a shorter distance. One embodiment receives input from the user where the user has positioned a cursor within the text data. An embodiment may then display a preview pane including at least a portion of the text data of the display data in which the cursor is positioned. One embodiment may additionally display a visual indicator within the display data to indicate which display data is included within the pane. In one embodiment, a user may be able to modify the data within the pane. An embodiment may then modify the display data to include these modifications.

The illustrated example embodiments will be best understood by reference to the figures. The following description is intended only by way of example, and simply illustrates certain example embodiments.

Figure 1:
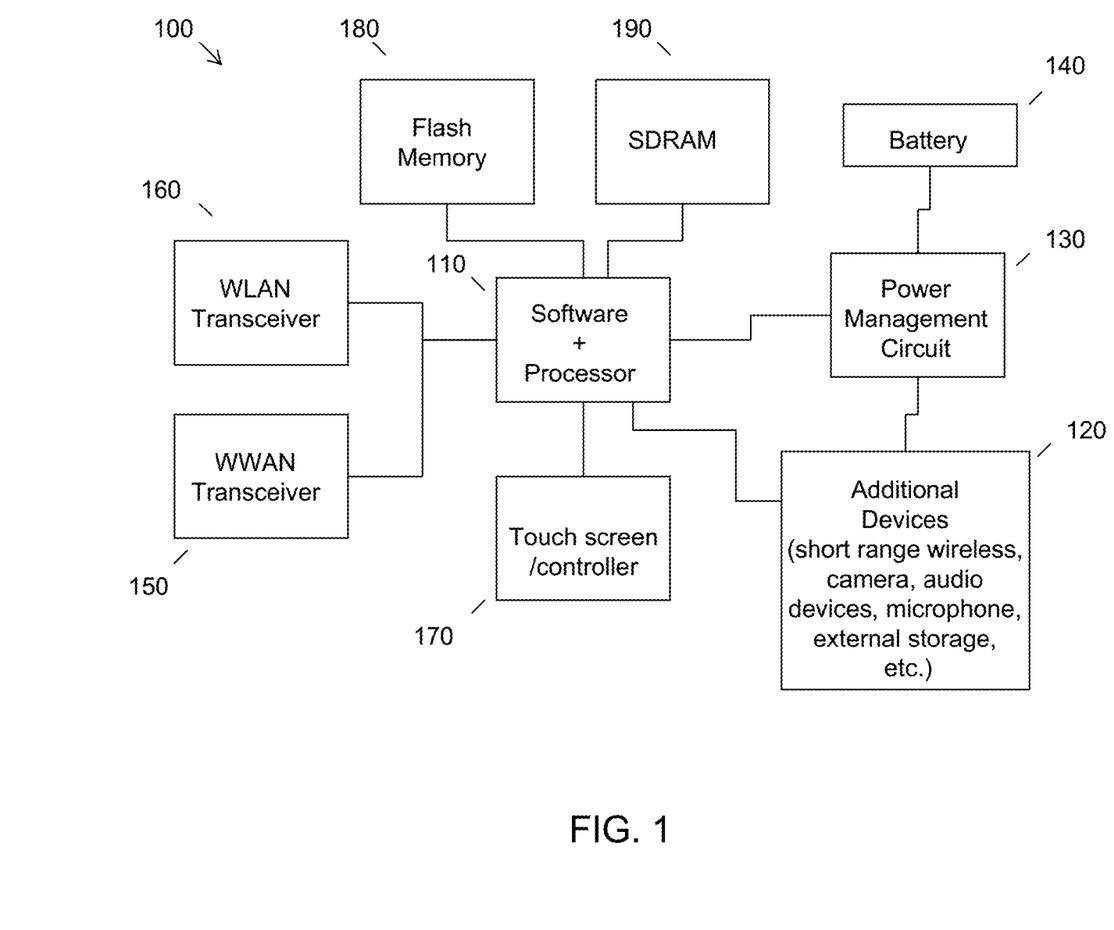
FIG. 1 illustrates an example of information handling device circuitry.

While various other circuits, circuitry or components may be utilized in information handling devices, with regard to smart phone and/or tablet circuitry 100, an example illustrated in FIG. 1 includes a system on a chip design found for example in tablet or other mobile computing platforms. Software and processor(s) are combined in a single chip 110. Processors comprise internal arithmetic units, registers, cache memory, busses, I/O ports, etc., as is well known in the art. Internal busses and the like depend on different vendors, but essentially all the peripheral devices (120) may attach to a single chip 110. The circuitry 100 combines the processor, memory control, and I/O controller hub all into a single chip 110. Also, systems 100 of this type do not typically use SATA or PCI or LPC. Common interfaces, for example, include SDIO and I2C.

There are power management chip(s) 130, e.g., a battery management unit, BMU, which manage power as supplied, for example, via a rechargeable battery 140, which may be recharged by a connection to a power source (not shown). In at least one design, a single chip, such as 110, is used to supply BIOS like functionality and DRAM memory.

System 100 typically includes one or more of a WWAN transceiver 150 and a WLAN transceiver 160 for connecting to various networks, such as telecommunications networks and wireless Internet devices, e.g., access points. Additional devices 120 are commonly included. System 100 often includes a touch screen 170 for data input and display/rendering. System 100 also typically includes various memory devices, for example flash memory 180 and SDRAM 190.

Figure 2:
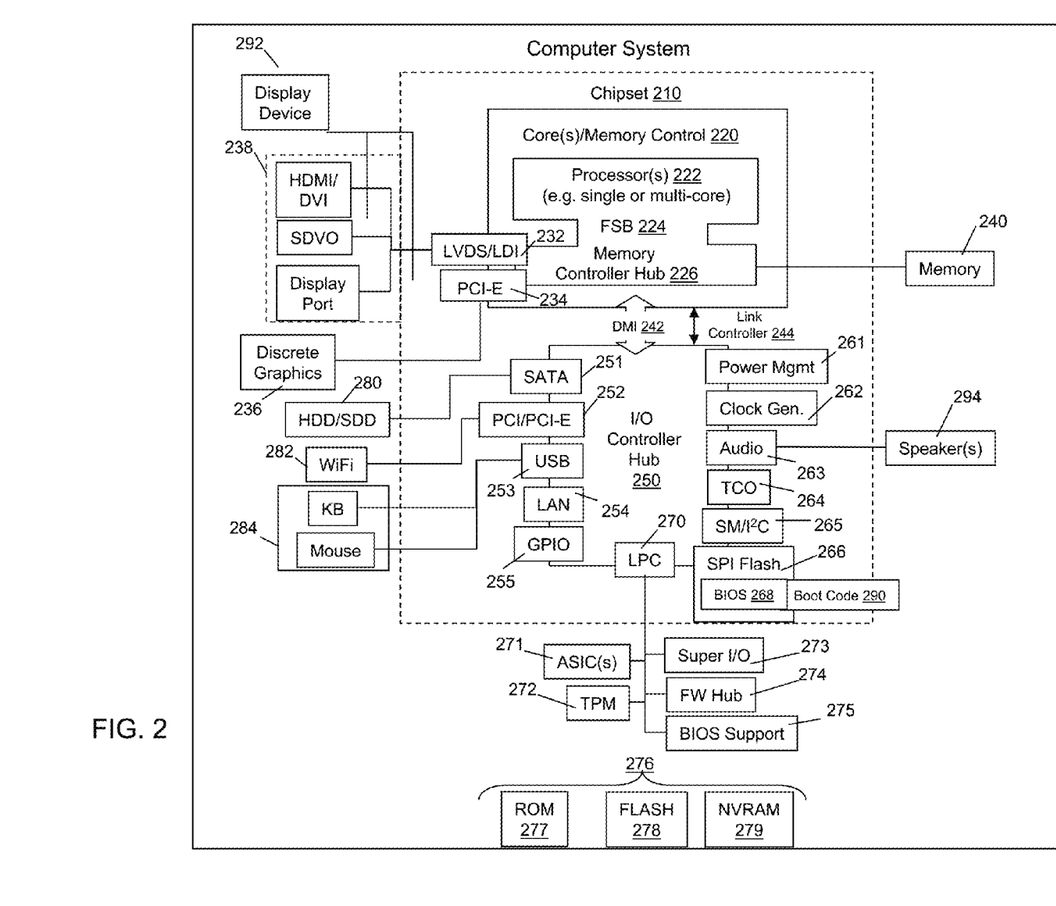
FIG. 2 illustrates another example of information handling device circuitry.

FIG. 2 depicts a block diagram of another example of information handling device circuits, circuitry or components. The example depicted in FIG. 2 may correspond to computing systems such as the THINKPAD series of personal computers sold by Lenovo (US) Inc. of Morrisville, N.C., or other devices. As is apparent from the description herein, embodiments may include other features or only some of the features of the example illustrated in FIG. 2.

The example of FIG. 2 includes a so-called chipset 210 (a group of integrated circuits, or chips, that work together, chipsets) with an architecture that may vary depending on manufacturer (for example, INTEL, AMD, ARM, etc.). INTEL is a registered trademark of Intel Corporation in the United States and other countries. AMD is a registered trademark of Advanced Micro Devices, Inc. in the United States and other countries. ARM is an unregistered trademark of ARM Holdings plc in the United States and other countries. The architecture of the chipset 210 includes a core and memory control group 220 and an I/O controller hub 250 that exchanges information (for example, data, signals, commands, etc.) via a direct management interface (DMI) 242 or a link controller 244. In FIG. 2, the DMI 242 is a chip-to-chip interface (sometimes referred to as being a link between a "northbridge" and a "southbridge"). The core and memory control group 220 include one or more processors 222 (for example, single or multi-core) and a memory controller hub 226 that exchange information via a front side bus (FSB) 224; noting that components of the group 220 may be integrated in a chip that supplants the conventional "northbridge" style architecture. One or more processors 222 comprise internal arithmetic units, registers, cache memory, busses, I/O ports, etc., as is well known in the art.

In FIG. 2, the memory controller hub 226 interfaces with memory 240 (for example, to provide support for a type of RAM that may be referred to as "system memory" or "memory"). The memory controller hub 226 further includes a LVDS interface 232 for a display device 292 (for example, a CRT, a flat panel, touch screen, etc.). A block 238 includes some technologies that may be supported via the LVDS interface 232 (for example, serial digital video, HDMI/DVI, display port). The memory controller hub 226 also includes a PCI-express interface (PCI-E) 234 that may support discrete graphics 236.

In FIG. 2, the I/O hub controller 250 includes a SATA interface 251 (for example, for HDDs, SDDs, etc., 280), a PCI-E interface 252 (for example, for wireless connections 282), a USB interface 253 (for example, for devices 284 such as a digitizer, keyboard, mice, cameras, phones, microphones, storage, other connected devices, etc.), a network interface 254 (for example, LAN), a GPIO interface 255, a LPC interface 270 (for ASICs 271, a TPM 272, a super I/O 273, a firmware hub 274, BIOS support 275 as well as various types of memory 276 such as ROM 277, Flash 278, and NVRAM 279), a power management interface 261, a clock generator interface 262, an audio interface 263 (for example, for speakers 294), a TCO interface 264, a system management bus interface 265, and SPI Flash 266, which can include BIOS 268 and boot code 290. The I/O hub controller 250 may include gigabit Ethernet support.

The system, upon power on, may be configured to execute boot code 290 for the BIOS 268, as stored within the SPI Flash 266, and thereafter processes data under the control of one or more operating systems and application software (for example, stored in system memory 240). An operating system may be stored in any of a variety of locations and accessed, for example, according to instructions of the BIOS 268. As described herein, a device may include fewer or more features than shown in the system of FIG. 2.

Information handling device circuitry, as for example outlined in FIG. 1 or FIG. 2, may be used in devices such as tablets, smart phones, personal computer devices, generally, and/or other electronic devices which users use to create or modify documents, spreadsheets, and other modifiable applications. For example, the circuitry outlined in FIG. 1 may be implemented in a tablet or smart phone embodiment, whereas the circuitry outlined in FIG. 2 may be implemented in a personal computer embodiment.

Figure 3:
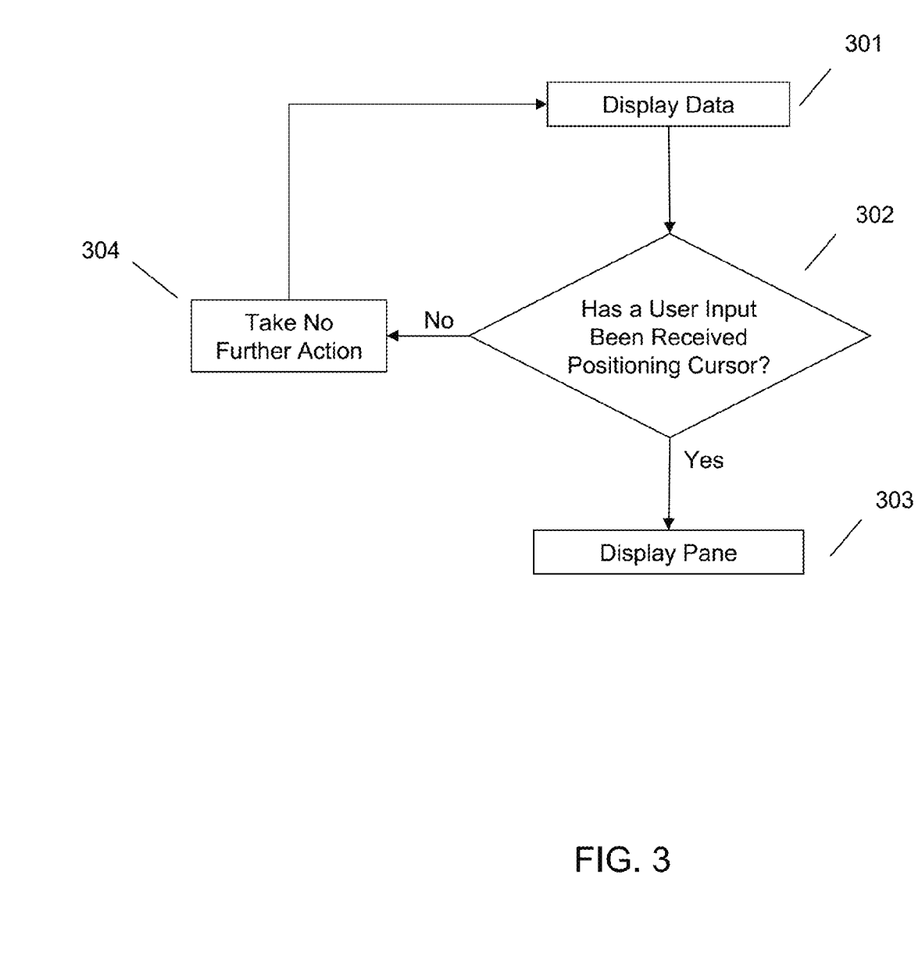
FIG. 3 illustrates an example method of a preview pane for touch input devices.

Referring now to FIG. 3, an embodiment may display text data at 301 on a display device (e.g., monitor, touch screen, television, etc.). This data may include images, text, applications, or other user modifiable data. An embodiment may receive a user input where the user positions a cursor within the text data at 302. This user input may be in the form of a touch input, keyboard input, mouse input, or the like. If an embodiment does not receive such an input, it may take no further action at 304.

Upon receiving this user input, an embodiment may display a preview pane located near the input device at 303. This preview pane may include at least a portion of the display data in which the cursor is positioned. For example, referring to FIGS. 4-7, the preview pane 404, 504, 604, and 704 include the display data 401, 501, 601, and 701 where the cursor 403, 503, 603 and 703 is positioned. The preview pane 404 is located in FIG. 4 on the same plane as the input device 405, where the input device may be a conventional keyboard or a soft keyboard.

Figure 4:
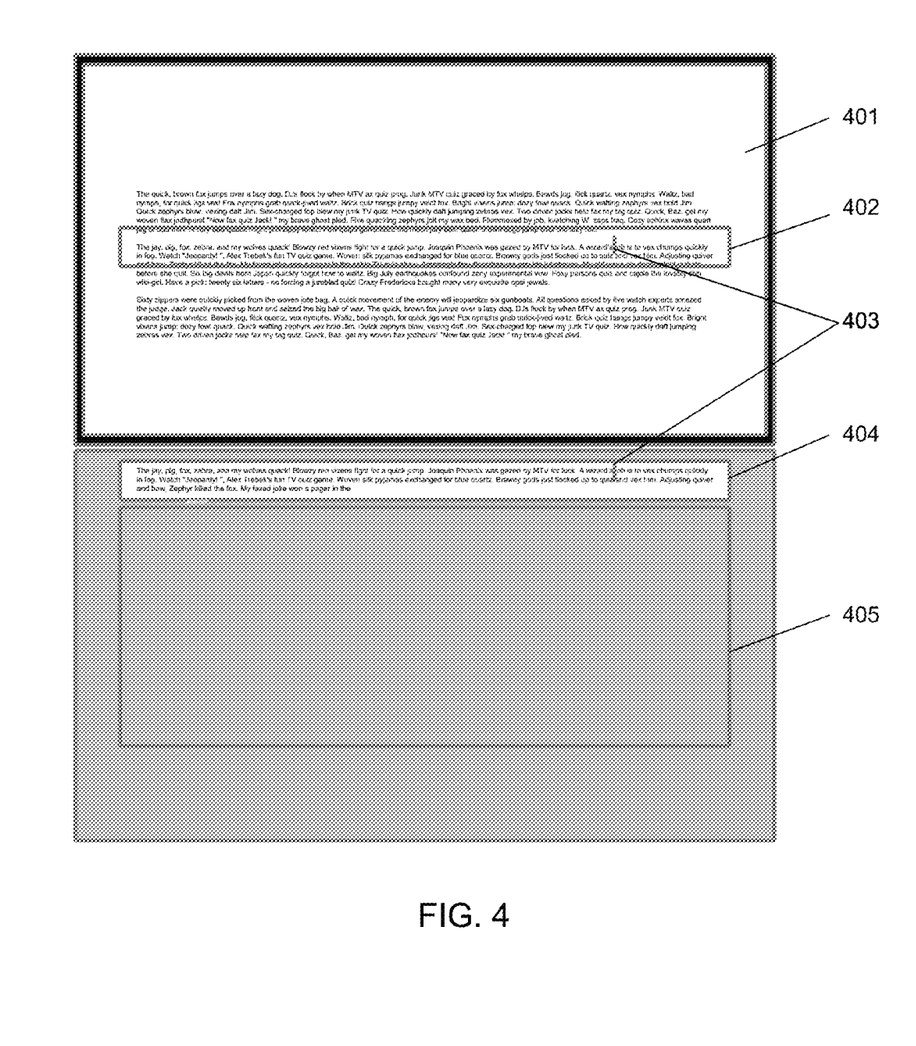
FIG. 4 illustrates an example layout of a preview pane displayed on a device comprising an input device.

This configuration might be included, for example, in a laptop configuration where the display device is above a hinge and the input device is below the hinge. As another example, the preview pane 404 might be included on a keyboard and the display device may be a television connected to an information handling device. The preview pane 404 may, for example, take the place of the function keys on a standard keyboard. In other words, in this configuration the preview pane may be co-located on the same surface, plane, or device as the input device. Additionally, this configuration may be used in an application where the input device comprises a set amount of space.

Figure 5:
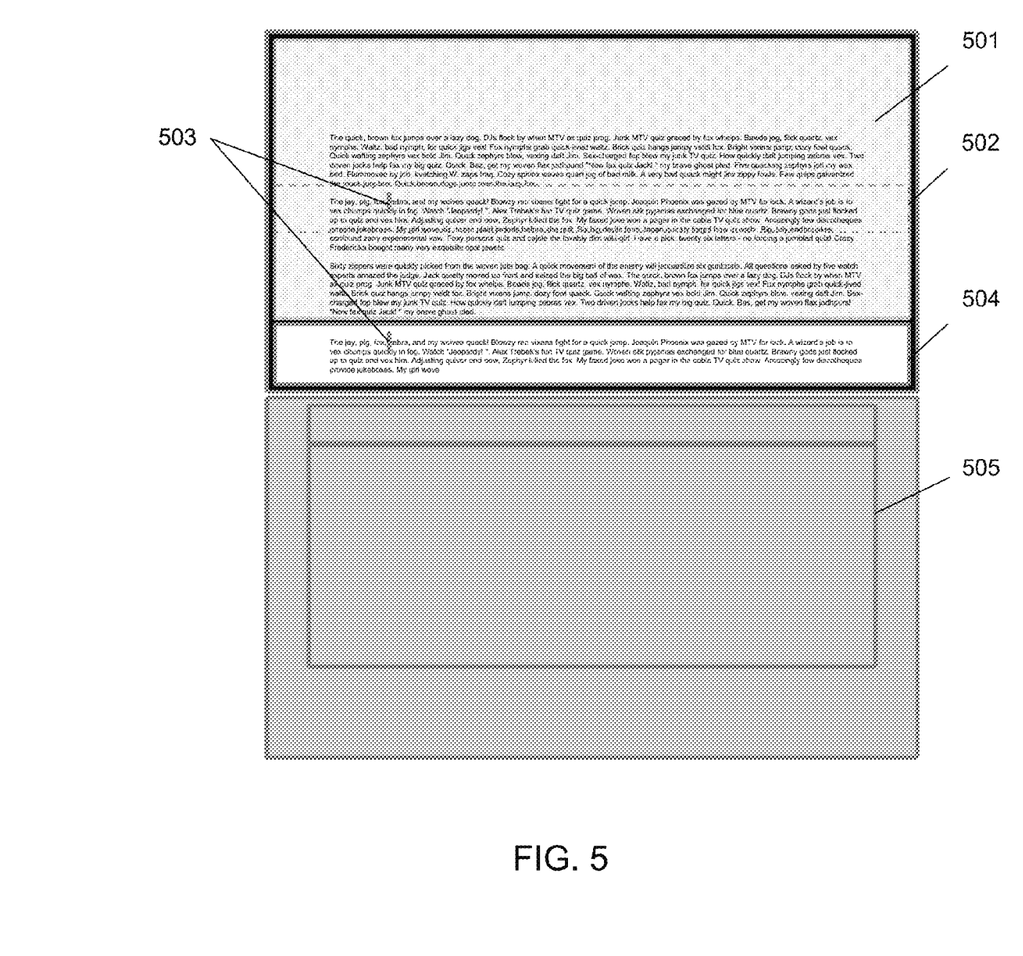
FIG. 5 illustrates an example layout of a preview pane displayed on a display device.

The configuration shown in FIG. 5 shows the preview pane 504 displayed on the display device. This configuration might be included on a tablet where the display may be at the top of the screen and the input device is at the bottom of the screen or in a hinged laptop configuration with the input device being on the lower portion, as illustrated in the non-limiting example of FIG. 5. The preview pane 504 may be located directly above the input device 505. In other words, in this configuration the preview pane is located on the display device that is being used to display the data, i.e., the main display device and the preview pane are co-located. Other configurations can be imagined, therefore, these configurations are just shown as examples.

One embodiment may display a visual indicator in the display data indicating the portion of the display data which is being displayed in the preview pane. For example, referring to FIGS. 4-7, a visual indicator 402, 502, 602, and 702 may be included in the display data 401, 501, 601, and 701. This visual indicator may be a border as shown in FIGS. 4-7, or it may be a different type of visual indicator. For example, the data included in the pane may blink, be surrounded by brackets, may be bubbled, may be highlighted, or some other form of indication to inform the user which data is included in the preview pane.

In one embodiment, the preview pane may be a window that accepts editing input. For example, the preview pane may include a touch sensitive layer and allow the user to manipulate the text data (e.g., modifying the text data) similar to how the user can manipulate the display data on a touch screen. For example, an embodiment may allow a user to input data directly into the preview pane, e.g., using a selection action such as a touch within the preview pane followed by input(s) provided to the input device, e.g., 505.

Additionally or alternatively, an embodiment may allow a user to scroll through the text data using the preview pane, zoom in on the text data, move the cursor within the preview pane, or otherwise manipulate the data on within the preview pane and/or the main display. For example, upon receiving user input within this pane, an embodiment may modify the text data displayed in the display device according to the editing inputs received via the preview pane. For example, a user may reposition the cursor in the preview pane and this may reposition the cursor within the text data displayed in the display device. Alternatively, the text data displayed in the display device may not be updated until the user has indicated they are done making modifications in the preview pane. This indication may include closing the pane, selecting submit, or other forms of indications indicating completion of modifications. Likewise, certain inputs to the preview pane, e.g., zoom gestures (zooming in an out in the preview pane), may or may not be replicated on the main display.

An embodiment may allow a user to refocus the pane to include a new portion of display data. For example, a user may select text data outside of the data that is currently included within the preview pane. A user may do this by repositioning the cursor within the text data displayed in the display device. Upon receiving this input an embodiment may refocus the preview pane to include this new portion of text data that correlates with the new position of the cursor (i.e., update the pane to show the new portion of display data).

An embodiment allows a user to view main display data within the pane even if the main display is changed (e.g., minimized, overlaid, etc.). Thus, a user may minimize the display data while continuing display of the preview pane and associated text data. For example, the user may prefer to have an alternative application open (e.g., over top of the text data of the main display). This may correspond to a use case in which the user is composing an email and wishes to view a web page during the composing of the email. Thus, the user may overlay a web browser window over top of the email window. In such a case, an embodiment may continue to display email text data in the preview pane.

Figure 6:
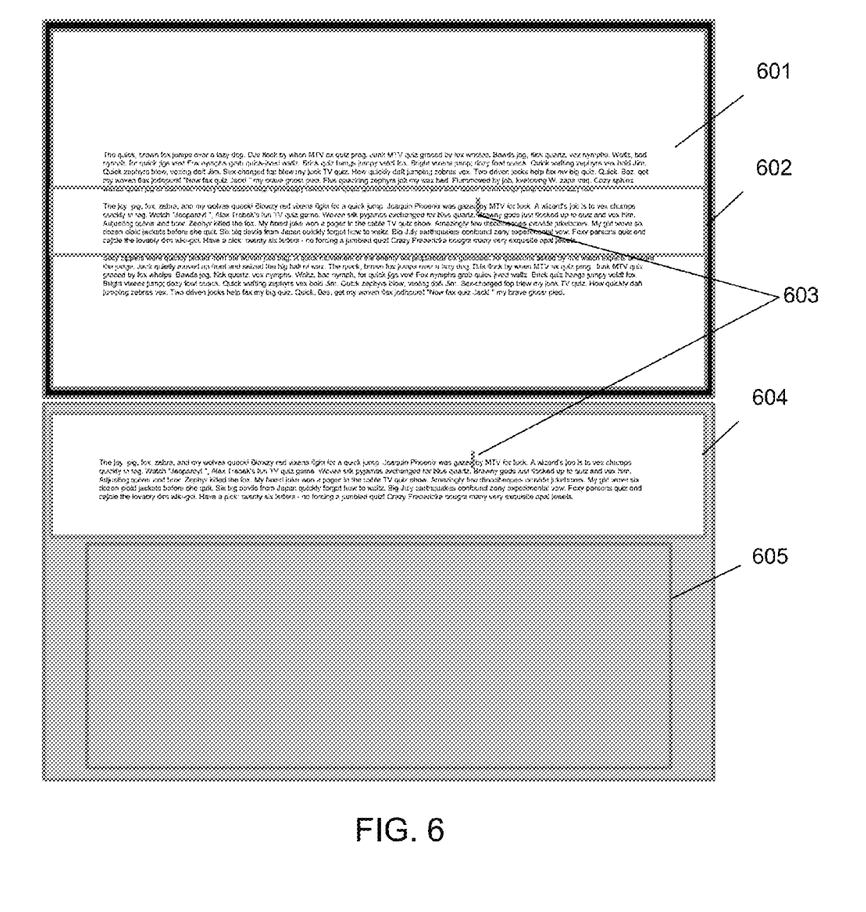
FIG. 6 illustrates an example layout of a preview pane with a full content view.

For example, referring to FIG. 6, the preview pane 604 contains a full content view of the display data 601, which is a larger view of the main display's text data. A user may then be able to open a new application to replace the currently displayed data 601. A user may, for example, be typing a document but needs an email to remain open for reference. A user may be able to open the document and select a position for the cursor, minimize the document, and reference the email in the display area where the display data would normally be displayed. This may assist a user who has a limited amount of display space.

Figure 7:
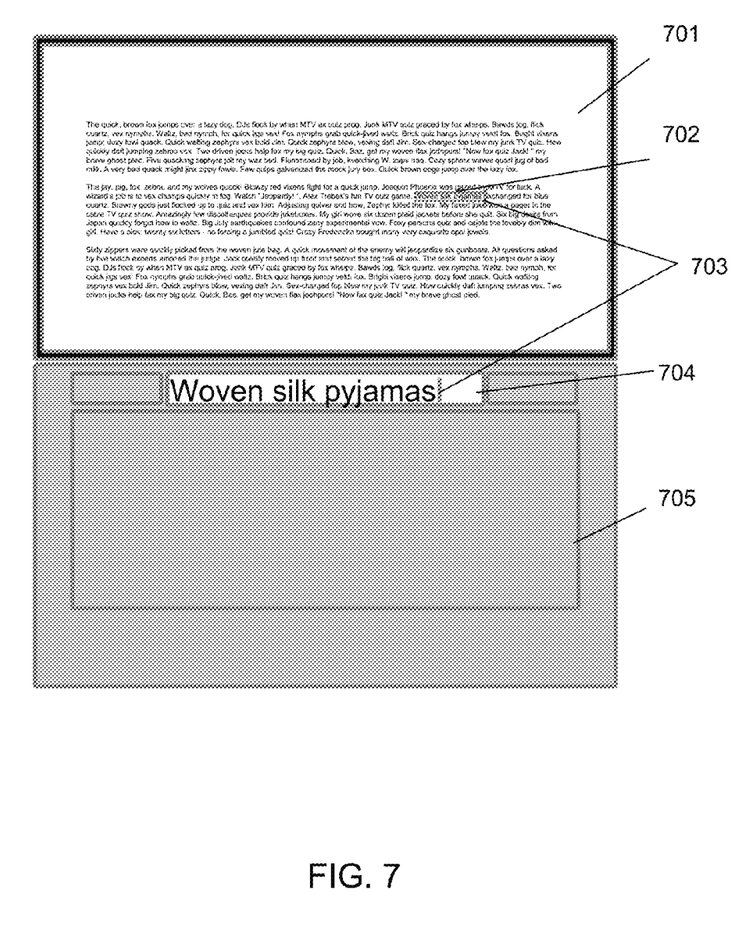
FIG. 7 illustrates an example layout of a preview pane where the preview pane displays text larger than the display data.

In an embodiment, the text data contained within the preview pane is of a larger size than the text data displayed in the display device, as shown in FIG. 7. For example, a user may position the cursor between two words and the preview pane may just include the two words being of a larger font than the display data. This may allow the user to more finely position the cursor to the desired location. Additionally or alternatively, this larger size may allow the user the ability to better see details. For example, if the user is attempting to manipulate a group of pixels within an image, the larger size within the preview pane may allow the finer manipulation that the user desires.

Accordingly, as illustrated by the example embodiments and the figures, an embodiment provides a method in which display data including text data is displayed on a display device. When a user positions a cursor within the text data, a preview pane is displayed. This preview pane may be displayed in different configurations, for example, on the same surface as either the input device, on the display device, or the like. The preview pane displays at least a portion of the text data of the display data in which the cursor is positioned. In one embodiment, this preview pane may accept editing input in the preview pane, allowing the user to modify the text data. Thus, an embodiment provides a preview pane that includes a portion of text data displayed on a display device, allowing a user a reduced amount of eye travel and a reduction in the amount of time needed to complete data entry.

As will be appreciated by one skilled in the art, various aspects may be embodied as a system, method or device program product. Accordingly, aspects may take the form of an entirely hardware embodiment or an embodiment including software that may all generally be referred to herein as a "circuit," "module" or "system." Furthermore, aspects may take the form of a device program product embodied in one or more device readable medium(s) having device readable program code embodied therewith.

It should be noted that the various functions described herein may be implemented using instructions stored on a device readable storage medium such as a non-signal storage device that are executed by a processor. A storage device may be, for example, an electronic, magnetic, optical, electromagnetic, infrared, or semiconductor system, apparatus, or device, or any suitable combination of the foregoing. More specific examples of a storage medium would include the following: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a storage device is not a signal and "non-transitory" includes all media except signal media.

Program code embodied on a storage medium may be transmitted using any appropriate medium, including but not limited to wireless, wireline, optical fiber cable, RF, et cetera, or any suitable combination of the foregoing.

Program code for carrying out operations may be written in any combination of one or more programming languages or machine code. The program code may execute entirely on a single device, partly on a single device, as a stand-alone software package, partly on single device and partly on another device, or entirely on the other device. In some cases, the devices may be connected through any type of connection or network, including a local area network (LAN) or a wide area network (WAN), or the connection may be made through other devices (for example, through the Internet using an Internet Service Provider), through wireless connections, e.g., near-field communication, or through a hard wire connection, such as over a USB connection.

Example embodiments are described herein with reference to the figures, which illustrate example methods, devices and program products according to various example embodiments. It will be understood that the actions and functionality may be implemented at least in part by program instructions. These program instructions may be provided to a processor of a general purpose information handling device, a special purpose information handling device, or other programmable data processing device to produce a machine, such that the instructions, which execute via a processor of the device implement the functions/acts specified.

It is worth noting that while specific blocks are used in the figures, and a particular ordering of blocks has been illustrated, these are non-limiting examples. In certain contexts, two or more blocks may be combined, a block may be split into two or more blocks, or certain blocks may be re-ordered or re-organized as appropriate, as the explicit illustrated examples are used only for descriptive purposes and are not to be construed as limiting.

As used herein, the singular "a" and "an" may be construed as including the plural "one or more" unless clearly indicated otherwise.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Thus, although illustrative example embodiments have been described herein with reference to the accompanying figures, it is to be understood that this description is not limiting and that various other changes and modifications may be affected therein by one skilled in the art without departing from the scope or spirit of the disclosure.

What is claimed is:

1. A method, comprising:
   displaying text data that has been input into an application at a first display location on a display device;
   receiving, using a processor, a user input positioning a cursor within the displayed text data; and
   displaying, at a second display location comprising a preview pane, text data corresponding to at least a portion of the displayed text data in which the cursor is positioned, wherein the preview pane comprising the text data corresponding to at least a portion of the displayed text data is located in a position separate and discrete from the displayed text data at the first display location;
   wherein the preview pane objectively communicates with the displayed text data and allows editing input manipulating the text data corresponding to at least a portion of the displayed text data and upon receiving editing input to the text data corresponding to the at least a portion of the displayed text data, the displayed text data is modified according to the received editing input.

2. The method of claim 1, further comprising displaying a visual indicator on the display device indicating the portion of the display device being displayed in the preview pane.

3. The method of claim 1, further comprising accepting editing input, wherein the editing input is provided by a user in the preview pane.

4. The method of claim 3, wherein the editing input modifies the text data included in the preview pane.

5. The method of claim 3, wherein the editing input repositions the cursor within the text data displayed on the display device.

6. The method of claim 1, wherein the preview pane is provided on a device comprising an input device.

7. The method of claim 1, wherein the preview pane is included in the display device.

8. The method of claim 1, wherein the text data contained within the preview pane is of a larger size than the text data displayed on the display device.

9. The method of claim 1, further comprising changing display data of the display device while continuing display of text data of the preview pane.

10. An information handling device, comprising:
    a display device;
    a processor operatively coupled to the display device;
    a memory device that stores instructions executable by the processor to:
    display text data that has been input into an application at a first display location on the display device;
    receive a user input positioning a cursor within the text data; and
    display at a second display location comprising a preview pane, text data corresponding to at least a portion of the displayed text data in which the cursor is positioned, wherein the preview pane comprising the text data corresponding to at least a portion of the displayed text data is located in a position separate and discrete from the displayed text data at the first display location;

wherein the preview pane objectively communicates with the displayed text data and allows editing input manipulating the text data corresponding to at least a portion of the displayed text data and upon receiving editing input to the text data corresponding to the at least a portion of the displayed text data, the displayed text data is modified according to the received editing input.

11. The information handling device of claim 10, wherein the instructions are further executable by the processor to display a visual indicator on the display device indicating the portion of the display device being displayed in the preview pane.

12. The information handling device of claim 10, wherein the instructions are further executable by the processor to accept editing input, wherein the editing input is provided by a user in the preview pane.

13. The information handling device of claim 12, wherein the editing input modifies the text data included in the preview pane.

14. The information handling device of claim 12, wherein the editing input repositions the cursor within the text data displayed on the display device.

15. The information handling device of claim 10, wherein the preview pane is provided on a device comprising an input device.

16. The information handling device of claim 10, wherein the preview pane is included in the display device.

17. The information handling device of claim 10, wherein the text data contained within the preview pane is of a larger size than the text data displayed on the display device.

18. A product, comprising:

a storage device having code stored therewith, the code being executable by a processor and comprising:

code that displays text data that has been input into an application at a first display location on a display device;

code that receives a user input positioning a cursor within the text data; and code that displays at a second display location comprising a preview pane, text data corresponding to at least a portion of the displayed text data in which the cursor is positioned, wherein the preview pane comprising the text data corresponding to at least a portion of the displayed text data is located in a position separate and discrete from the displayed text data at the first display location;

wherein the preview pane objectively communicates with the displayed text data and allows editing input manipulating the text data corresponding to at least a portion of the displayed text data and upon receiving editing input to the text data corresponding to the at least a portion of the displayed text data, the displayed text data is modified according to the received editing input.

* * * * *